May 27, 1969  A. G. R. GATES  3,446,501
CLUTCHES

Filed Nov. 16, 1967  Sheet 2 of 3

Inventor
ALBERT GEORGE RONALD GATES

By
Cushman Darby & Cushman
Attorneys

May 27, 1969  A. G. R. GATES  3,446,501
CLUTCHES

Filed Nov. 16, 1967  Sheet 3 of 3

Inventor
ALBERT GEORGE RONALD GATES

By
Cushman, Darby & Cushman
Attorneys

United States Patent Office 3,446,501
Patented May 27, 1969

3,446,501
CLUTCHES
Albert George Ronald Gates, London, England, assignor to Gestetner Limited, London, England, a British company
Filed Nov. 16, 1967, Ser. No. 683,527
Claims priority, application Great Britain, Nov. 16, 1966, 51,420/66
Int. Cl. B65h 1/00
U.S. Cl. 271—62                                    16 Claims

ABSTRACT OF THE DISCLOSURE

The invention relates to a clutch mechanism which may be manually engaged and disengaged and which, when engaged, will remain in this condition until the torque differential between the driving and driven members exceeds a predetermined adjustable value at which point cam surfaces on the driving and driven members throw the clutch out of engagement by overcoming an adjustable detent mechanism. The clutch is preferably, but not essentially, for use in a power driven feed board raising mechanism for a duplicator.

---

This invention relates to clutches and has for its object the provision of a clutch for coupling a driven member to a driving member which clutch automatically becomes disengaged when the resistance to movement of the driven member exceeds a predetermined value.

According to this invention, there is provided a clutch comprising a driving member adapted to be rotated in one direction; a driven member arranged for rotation about the same axis as the driving member and capable of being urged into engagement with the driving member for rotation therewith; a camming engaging means tending to urge apart said driving and driven members upon slipping of the clutch; a pressure-applying member arranged so that rotational movement thereof in one direction moves such member to a clutch engaging position in which it urges the driven member into engagement with the driving member and tends to be rotated by the driven member, while rotational movement in the opposite direction releases such urging pressure; and a detent mechanism between the said pressure-applying member and a part of the clutch stationary with respect to the pressure-applying member, the arrangement being such that, when the pressure-applying member is in its clutch engaging position, rotational movement of the said pressure-applying member in the direction of rotation of the driven member is resisted by the said detent mechanism so that the said pressure-applying member remains in the clutch engaging position while the driven member is rotating with relatively low resistance to rotation, but, when such resistance to rotation of the driven member exceeds a predetermined value, slip takes place and said camming engaging means urges the driven member more strongly against the pressure-applying member and increased torque on the pressure-applying member causes the latter to overcome the detent mechanism and move into a clutch disengaging position.

The detent mechanism preferably comprises a member carried by said relatively stationary part and biased into engagement with a cam surface carried by the pressure-applying member. Such detent member may conveniently be a spring pressed ball or round-headed plunger.

According to a further feature of this invention, the pressure applying member includes at least two equi-angularly spaced cam surfaces formed on the axial face thereof remote from the driven member, such cam surfaces cooperating with corresponding cam projections on the adjacent surface of said stationary part of the clutch, in order to cause axial sliding of the pressure applying member towards the driving member upon rotation from the clutch disengaging position to the clutch engaging position and to cause rotation of the pressure applying member from the clutch engaging position to the clutch disengaging position upon axial sliding of the pressure applying member away from the driving member.

In a preferred construction the said part of the clutch which is stationary with respect to the pressure applying member has projecting therefrom a shaft on which the driving member, driven member and pressure-applying member are rotatable and axially slidable and on which the driving member is rotatable and axially fixed, the detent member projecting from said stationary part in a direction parallel to said shaft and from the same side of the part as the shaft.

According to a still further feature of this invention, the camming means, tending to urge apart the driven member and driving member during slip, comprises cooperating studs and holes for coupling the two members together for rotation when the driven member is urged against the driving members, the holes exerting a camming action on the studs to move the driven member away from the driving member when the torque resistance of the driven member becomes too high and slip occurs. Conveniently, the studs are on the driven member and the cooperating holes in the driving member.

Advantageously, the driven member is constructed to be of high moment of inertia, e.g. by having a part thereof formed of load, so as to act as a damping means on the movement of the part to be driven by the driven member.

Any suitable mechanism may be provided for rotating the pressure-applying member back against the action of the detent mechanism and into the clutch engaging position. In one convenient construction, the pressure-applying member may have an arm projecting radially therefrom and movable to rotate the pressure-applying member in the appropriate direction by means of a simple lever mechanism.

A particularly suitable use for a clutch according to this invention is in a mechanism for providing automatic raising of the feed board of a stencil or off-set duplicating machine to a position in which sheets carried by the feed board are in a position to be fed through the machine, and one embodiment of such a mechanism will now be described merely by way of example. This clutch and its application in an automatic feed board raising mechanism are illustrated in the accompanying drawings, in which.

Figure 1:
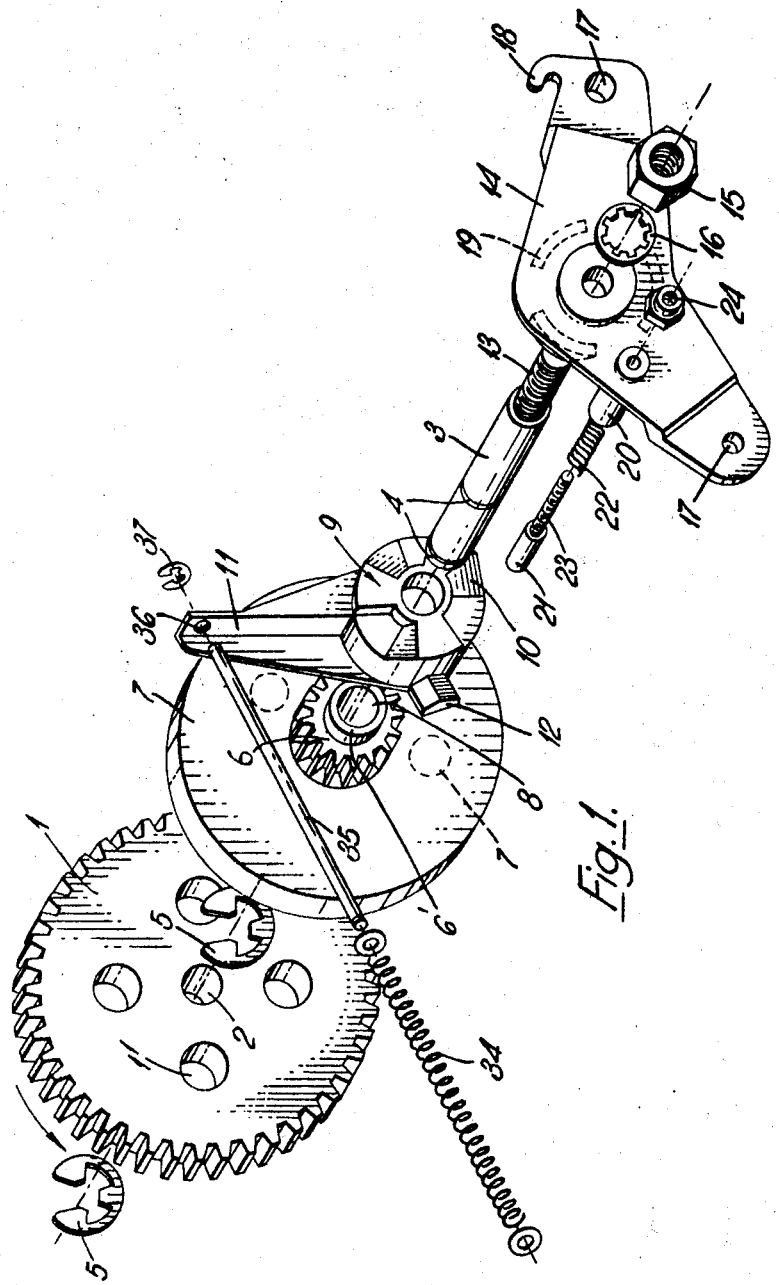
FIGURE 1 is an exploded perspective view of the clutch.

Referring first to FIGURE 1, the clutch there illustrated comprises a driving member in the form of a cog wheel 1 having a central axial hole 2 for receiving a shaft 3. The shaft 3 has therein two circumferential grooves 4 to receive spring clips 5 to retain the cog wheel 1 axially in position on the shaft, the wheel 1 thereby being fixed in its axial position, but being capable of rotating on said shaft. The wheel 1 also has therein four equi-angularly spaced holes 1'. The clutch additionally comprises a driven member comprising a cog wheel 6, of smaller diameter than the wheel 1, and a disc 7 which is of comparable diameter to the wheel 1 and to which the wheel 6 is secured. The assembly comprising the wheel 6 and disc 7 have a central hole 8 by which the assembly may be fitted on the shaft 3 so as to be rotatable thereon and axially movable therealong. The disc 7 which is made of lead has secured to the face thereof remote from wheel 6 two semi-spherical studs 7', these studs being at diametrically opposed positions and such as to engage in two of the holes 1' in the wheel 1 when the disc 7 is moved into engagement with such wheel.

Figure 3:
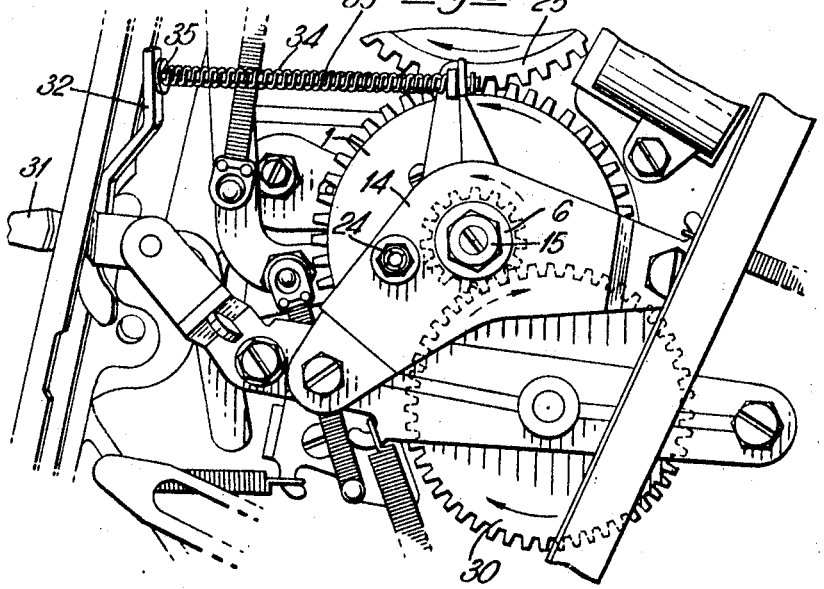
FIGURE 3 is a side elevation similar to FIGURE 2, but showing the clutch of FIGURE 1 fitted to the machine.
Figure 4:
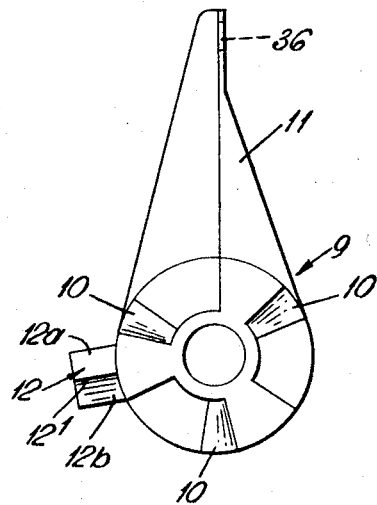
FIGURE 4 is a front elevational view of the pressure applying member.
Figure 5:
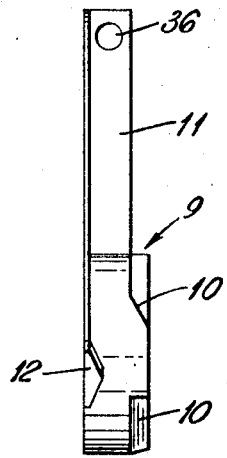
FIGURE 5 is a side elevational view of the member of FIGURE 4.

Also on the shaft 3 and on the side of the wheel 6 remote from the wheel 1 is a pressure-applying member 9. This member 9 is basically a cylindrical block positioned with the end face thereof adjacent the wheel 6 in contact with a surface 6' of the cog, and on the end face remote from the wheel 6 the block has three cam surfaces 10 spaced at equi-angularly spaced positions around the axis of the shaft, and which also has a bracket arm 11 projecting outwardly from one part of its circumference and a lug 12 from another part of the circumference 90° round from the bracket arm 11. This lug 12 has, on the surface thereof facing away from the wheel 6, upper and lower cam surfaces 12a and 12b which slope towards the wheel 6 on both sides of a central radial line 12', i.e. the line 12' is nearer the stationary part 14 than are the surfaces 12a and 12b. The shaft 3 is formed integrally with a thermal stud 13 which extends through an aperture in plate 14 which, in use of the clutch, will be relatively stationary. The stud 13 is secured to the plate 14 by a nut 15 and washer 16 and thus the stud 13 and shaft 3 are fixed with respect to the plate 14 since the plate is clamped between the nut 15 and a shoulder on the adjacent end of shaft 3. The plate has holes 17 for mounting the plate in the machine and a hook 18 at one end serving to retain one end of a spring, as can be seen in FIGURE 3. Also projecting from the plate 14 are three cam projections 19, these being equi-angularly spaced around the shaft 3 and being in a position to engage the cam surfaces 10 of the pressure-applying member 9. The plate 14 also has projecting from the same side as the shaft 3 a sleeve 20 in which is mounted a detent member 21 urged outwardly from the plate by a spring 22. The detent member 21 is carried by a bolt 23 which passes through the sleeve 20 and receives a nut 24 on its end remote from the member 21. The nut 24 prevents the detent member from accidentally coming completely out of the sleeve 20 and longitudinal movement of the nut 24 with respect to the detent member 21 enables adjustment of the biasing pressure of the spring 22 on the member 21 to be effected.

Figure 2:
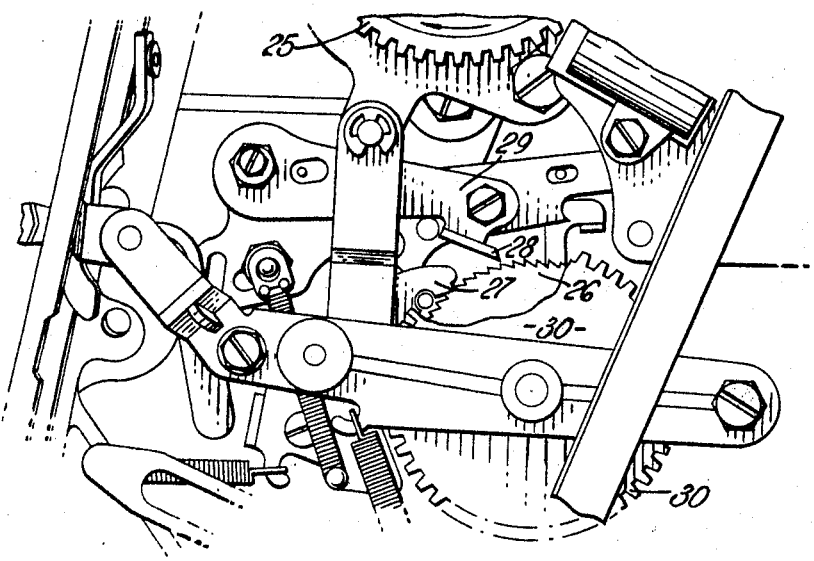
FIGURE 2 is a side view, with parts broken away, of part of the operating mechanism of an existing duplicating machine for which the clutch illustrated in FIGURE 1 has been designed.

As previously indicated, the clutch just described is designed to be fitted to an existing duplicating machine, part of the mechanism of which is shown in FIGURE 2. This mechanism as shown includes a cog wheel 25 which, in operation of the machine rotates in a clockwise direction as viewed in FIGURE 2. The mechanism also includes a further wheel 26 having around its periphery a number of teeth of saw tooth shape. Associated with this wheel 26 is a retaining pawl 27 and a driving pawl 28. A further cog wheel 30 rotates with the wheel 26. The driving pawl 28 is carried by a link 29 which, in use of the machine, reciprocates to cause the driving pawl 28 to advance the saw toothed wheel 26 intermittently in a clockwise direction by one or more teeth as each sheet is fed to the machine so as to maintain a constant paper stack height. When the stack of sheets has been used and the feed board has risen to its highest position, a mechanism (not shown) moves the retaining pawl 27 and driving pawl 28 out of engagement with the saw toothed wheel 26 and the feed board then descends under the action of its own weight.

In the conventional machine so far described, in order that the feed board may, before the commencement of a duplicating operation, be brought quickly to the correct height for feeding of the top sheet of the stack of sheets on the feed board, the machine is provided with a knob by which the saw toothed wheel 26 may be rotated in a clockwise direction by hand so as thereby to raise the feed board. In use of this construction, the operator rotates the saw toothed wheel 26 until he feels a resistance to such rotation caused by the upper part of the stack of sheets on the feed board engaging an appropriate part of the feed mechanism of the machine. Such a system suffers from the disadvantage that it is possible for the operator to attempt to turn the saw toothed wheel 26 further than he should, thereby causing damage to the machine or incorrect feeding of the first few sheets of the stack. Further, the feed board and stack of sheets thereon is relatively heavy and this operation can become tiring if it has to be performed often.

These disadvantages can be overcome by use of the clutch illustrated in FIGURE 1 on such a machine as shown in FIGURE 3. By using the clutch of this invention the feed board may be raised rapidly and safely under power instead of manually.

As shown in FIGURE 3, the clutch is fitted in the machine so that the driving cog wheel 1 meshes with the cog wheel 25, and the cog wheel 6 meshes with the cog wheel 30 which rotates with the saw toothed wheel 26. It will be seen that the clockwise rotation of cog wheel 25 causes anti-clockwise rotation of the cog wheel 1 and, when the clutch is engaged, such rotation of cog wheel 1 causes anti-clockwise rotation of the smaller cog wheel 6 which in turn causes clockwise rotation of the wheel 30 and therefore of the saw toothed wheel 26, thereby raising the feed board of the machine.

Engagement of the clutch is effected by means of a control member 31 acting on the bracket arm 11 of the pressure-applying member 9 through the medium of a lever 32 and a spring 34 between such lever 32 and the bracket arm 11. As shown in FIGURES 1 and 3, the spring 34 is positioned around a rod 35 passing through a hole 36 in the bracket arm 11 and receiving a spring clip 37 on its end thereby forming an articulated joint.

In use of the clutch illustrated in FIGURE 1 and as applied to the mechanism shown in FIGURE 3, the clutch will, before operation, be in the disengaged position in which disc 7 is spaced from wheel 1 and the cam projections 19 are clear of the cam projections 10 of the pressure-applying member 9 and the detent member 21 engages the upper slope (as shown in FIGURE 1) of the lug 12. To operate the clutch, the operator lifts member 31 so that this swings clockwise, thereby causing lever 32 to move towards bracket arm 11 so that the latter, under the action of the spring 34, moves to rotate the pressure-applying member 9 in a clockwise direction, this rotation causing, by the interaction of cam projections 19 and cam surfaces 10, axial movement of the member 9 towards the driving cog wheel 1. This axial movement of member 9 presses the disc 7 against the driving cog wheel 1 so that the studs 7' on the disc engage in holes 1' in the wheel 1 and the driven cog wheel 6 is then driven by the wheel 1. The clockwise rotation and axial movement of the pressure-applying member 9 produced upon lifting of the control member 31 also causes the lug 12 to move upwardly relatively to the detent member 21 and this will rise up the upper slope of the cam surface of the lug and then down the lower slope of such surface so that, when the clutch is fully engaged and rotation of the driven cog wheel 6 tends to rotate the pressure-applying member 9 in an anti-clockwise direction, such rotation of the pressure-applying member is resisted by the detent member 21. The lever 32 is, on release of control member 31, automatically returned to its original position by the action of spring 34. Engagement of the clutch, as previously explained. causes rotation of the wheel 26 and raising of the feed board of the machine. Immediately the feed board reaches a height such that the top of the stack of sheets engages the appropriate part of the feed mechanism of the machine, the resistance to rotation of the driven cog wheel 6 increases and the wheel 1 will rotate relatively to the wheel 6, the camming action of the holes 1' on the studs 7', which pushes the wheel 6 away from the wheel 1 and against the member 9, tending to increase the bearing pressure of surface 6' against the adjacent surface of the pressure applying member 9. This causes an increase in the frictional drag of cog 6 on member 9 which rotates the member 9 in an anti-clockwise direction so that the lug of this member is then able to ride past the detent member 21 against the biasing provided by spring 22 and the clutch thereby becomes automatically disengaged and the feed board is no longer subjected to a raising action and the control linkages 31, 32, 33, 34, 35 and 37 return to its inoperative position. From then on the feed board will be raised by the normal operation of the pinion 28, and ratchet 27 acting on the saw toothed wheel 26. When, subsequently, the feed board descends on depletion of the stack or by depression of the control members 31, the disc 7 being made of lead acts as a flywheel and slows down the descent of the feed board.

An alternative form of detent mechanism associated with the lug 12 would be one in which the plunger 21 is not provided with a threaded portion 23, but has a radially outwardly extending flange at the left hand end of sleeve 20 (as viewed in FIGURE 1) which permits the tip of plunger 21 to protrude outwardly, but retains the flange of the plunger within the sleeve, thereby limiting leftward movement of the plunger. The bore of the sleeve 20 has a diameter large enough to accommodate the plunger flange, and has a threaded portion at the end opposite its radially inwardly extending flange. A grub screw is threadedly engageable in the threaded end of the bore and has a lock nut for locking the grub screw when set in the bore. A helical compression spring such as 22 is placed within the sleeve 20 between the flange of plunger 21 and the tip of the grub screw.

The extended position of the plunger 21 is thus always the same, but the resilient biasing force of spring 22 is adjustable by axial adjustment of the grub screw within the bore of the sleeve 20. When set, the grub screw is locked by means of the lock nut.

I claim:

1. A rotary stencil duplicator comprising a main drive shaft; a drive shaft pinion on said drive shaft; feed board raising means; a feed board pinion associated with said feed board raising means; a clutch driving member rotatable about an axis; a gear wheel portion on said clutch driving member and in constant mesh with said drive shaft pinion; a clutch driven member rotatable about said axis; a further gear wheel portion on said clutch driven member and in constant mesh with said feed board pinion; first camming means for urging said driven member and said driving member apart when relative rotation between said members occurs; a pressure applying member rotatable about said axis between a clutch engaging position and a clutch disengaging position; said driven member being disposed between said pressure applying member and said driving member; second camming means for urging said pressure applying member towards said driving member upon rotation from said clutch disengaging position to said clutch engaging position; and causing rotation of said pressure applying member from said clutch engaging position to said clutch disengaging position upon axial sliding of said pressure applying member away from said driving member; and a surface on said driven member arranged for contacting the pressure applying member and exerting a torque on said pressure applying member.

2. A duplicator as defined in claim 1, and including a part of the clutch stationary with respect to said pressure engaging member; and rotation reisting detent means between said pressure applying member and said stationary part.

3. A duplicator as defined in claim 2, wherein said pressure applying member includes a detent engaging cam surface, and said detent means comprises a spring biased plunger mounted on said stationary part cooperating with said detent engaging cam surfaces.

4. A duplicator as defined in claim 1, and including a clutch actuating control on said duplicator frame, a radially outwardly extending bracket on said pressure applying member, and linkage means operatively associated with said bracket and said control.

5. A duplicator as defined in claim 1, and including a high inertia portion on said driven member.

6. In printing apparatus including a drive mechanism, a paper feed board and a powered feed board raising means, a clutch connecting said drive mechanism and said feed board raising means and comprising:
   (a) a driving member, rotatable about an axis;
   (b) a driven member rotatable about said axis;
   (c) first camming means for urging said driving member and said driven member apart when relative rotation of said members occurs;
   (d) a pressure applying member rotatable about said axis between a clutch engaging position and a clutch disengaging position, said driven member being disposed between said pressure applying member and said driving member;
   (e) second camming means for urging said pressure applying member towards said driving member upon rotation from said clutch disengaging position to said clutch engaging position, and causing rotation of said pressure applying member from said clutch engaging position to said clutch disengaging position upon axial sliding of said pressure applying member away from said driving member;
   (f) a part of the clutch stationary with respect to said pressure applying member;
   (g) rotation resisting detent means between said pressure applying member and said stationary part;
   (h) a surface on said driven member arranged for contacting the pressure applying member and exerting a torque on said pressure applying member.

7. A clutch as defined in claim 6, wherein said first camming means for urging said driving and driven members apart comprise balls on one of the members engaging with holes on the other of such members.

8. A clutch as defined in claim 7, wherein said balls comprise semi-spherical studs on said driven member and said holes comprise cylindrical recesses on said driving member.

9. A clutch as defined in claim 6, wherein said second camming means comprise a circular array of first cam surfaces on said pressure applying member arranged for engagement with corresponding second cam surfaces on said stationary part of the clutch.

10. A clutch as defined in claim 6, wherein said rotation resisting detent means comprises a spring loaded plunger mounted on said stationary part, and wherein a detent engaging cam surface is provided on said pressure applying member arranged for cooperating engagement with said plunger.

11. A clutch as defined in claim 10, wherein said cam surface comprises two symmetrical portions and a central line, said central line separating said two symmetrical portions and each said symmetrical portion diverging away from said stationary part in a direction away from said central line.

12. A clutch as defined in claim 11, wherein said pressure applying member is a substantially cylindrical body having a radially outwardly extending lug and a radially outwardly extending bracket, said lug being formed with said cam surface on the face thereof nearest said stationary part.

13. A clutch as defined in claim 12, including clutch actuating means operatively associated with said bracket.

14. A clutch as defined in claim 6, wherein said driven member includes a high inertia portion and torque transmitting means.

15. A clutch as defined in claim 14, wherein said high inertia portion comprises a disc made of lead, and wherein said torque transmitting means comprises a gear wheel portion.

16. A clutch as defined in claim 6, wherein said driving member also includes a torque transmitting gear wheel portion.

References Cited

UNITED STATES PATENTS 2,183,128  12/1939  Baker _____ 271—62

EDWARD A. SROKA, *Primary Examiner.*